United States Patent
Nishijima et al.

(10) Patent No.: US 6,958,495 B2
(45) Date of Patent: Oct. 25, 2005

(54) MIRROR ASSEMBLY WITH MULTI-COLOR ILLUMINATION

(75) Inventors: Kazuhiko Nishijima, Nagoya (JP); Timothy A. Bonardi, Buchanan, MI (US); John K. Roberts, East Grand Rapids, MI (US); Kenton Van Klompenberg, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 6 days.

(21) Appl. No.: 10/393,445

(22) Filed: Mar. 20, 2003

(65) Prior Publication Data

US 2004/0184282 A1 Sep. 23, 2004

(51) Int. Cl.[7] .......................... H01L 29/18; H01L 33/00
(52) U.S. Cl. .............................. 257/88; 257/98; 257/99; 340/461; 340/462; 362/516
(58) Field of Search ............................. 257/88, 98, 99; 340/461, 462; 362/516

(56) References Cited

U.S. PATENT DOCUMENTS

| | | |
|---|---|---|
| 3,266,016 A | 8/1966 | Maruyama et al. |
| 3,280,701 A | 10/1966 | Donnelly et al. |
| 4,588,267 A | 5/1986 | Pastore |
| 4,630,904 A | 12/1986 | Pastore |
| 4,741,603 A | 5/1988 | Miyagi et al. |
| 4,882,565 A | 11/1989 | Gallmeyer |
| 4,902,108 A | 2/1990 | Byker |
| 5,014,167 A | 5/1991 | Roberts |
| 5,066,112 A | 11/1991 | Lynam et al. |
| 5,069,535 A | 12/1991 | Baucke et al. |
| 5,076,673 A | 12/1991 | Lynam et al. |
| 5,115,346 A | 5/1992 | Lynam |
| 5,136,419 A | 8/1992 | Shabrang |
| 5,189,537 A | 2/1993 | O'Farrell |
| 5,207,492 A | 5/1993 | Roberts |

(Continued)

FOREIGN PATENT DOCUMENTS

| | | |
|---|---|---|
| CA | 2028461 | 11/1994 |
| EP | 0450162 A1 | 10/1994 |
| EP | 0728618 A2 | 8/1996 |
| EP | 0769419 A2 | 4/1997 |
| GB | 2326489 A | 12/1998 |
| JP | 56143416 A | 11/1981 |
| WO | 9530495 | 11/1995 |

OTHER PUBLICATIONS

Appendix A is a prior art mirror construction made by Schefenacker Vision Systems, prior to Apr. 2, 2003, which includes a bezel for supporting a mirror element, an angularly–adjustable mount, and a rear housing attached to the bezel.

1998 Ford Expedition Brochure, 24 pages, Aug. 1997.

Muth Advanced Technologies Smart Mirror Brochure (no date).

Muth Advanced Technologies Signal Mirror Brochure (no date).

International Body Engineering Conference material, "Dichoric Mirrors with Semi–active Covert Displays," John Roberts, 1993, pp. 65–70.

Primary Examiner—W. David Coleman
Assistant Examiner—Khiem Nguyen
(74) Attorney, Agent, or Firm—Price, Heneveld, Cooper, DeWitt & Litton, LLP; James E. Shultz, Jr.

(57) ABSTRACT

Rearview mirror assemblies are provided that incorporate a plurality of added features. In at least one embodiment, at least two devices are incorporated into a rearview mirror selected from a group comprising an interior illumination assembly, an illuminated operator interface and an information display. In at least one embodiment, the light rays emitted by the selected at least two devices comprise substantially the same spectral characteristics. In at least one embodiment, the spectral characteristics are operator selectable from a plurality of predetermined spectral characteristics.

58 Claims, 5 Drawing Sheets

U.S. PATENT DOCUMENTS

| | | | |
|---|---|---|---|
| 5,253,109 A | 10/1993 | O'Farrell et al. | |
| 5,285,060 A | 2/1994 | Larson et al. | |
| 5,313,335 A | 5/1994 | Gray et al. | |
| 5,336,448 A | 8/1994 | Byker | |
| 5,355,284 A | 10/1994 | Roberts | |
| 5,361,190 A | 11/1994 | Roberts et al. | |
| 5,416,313 A | 5/1995 | Larson et al. | |
| 5,446,576 A | 8/1995 | Lynam et al. | |
| D363,920 S | 11/1995 | Roberts et al. | |
| 5,481,409 A | 1/1996 | Roberts | |
| 5,504,478 A | 4/1996 | Knapp | |
| 5,528,422 A | 6/1996 | Roberts | |
| 5,587,699 A | 12/1996 | Faloon et al. | |
| 5,619,374 A | 4/1997 | Roberts | |
| 5,619,375 A | 4/1997 | Roberts | |
| 5,660,457 A | 8/1997 | Lyons | |
| 5,668,663 A | 9/1997 | Varaprasad et al. | |
| 5,669,704 A | 9/1997 | Pastrick | |
| 5,669,705 A | 9/1997 | Pastrick et al. | |
| 5,724,187 A | 3/1998 | Varaprasad et al. | |
| D394,833 S | 6/1998 | Muth | |
| 5,760,962 A | 6/1998 | Schofield et al. | |
| 5,786,772 A * | 7/1998 | Schofield et al. | 340/903 |
| 5,788,357 A | 8/1998 | Muth et al. | |
| 5,803,579 A * | 9/1998 | Turnbull et al. | 362/516 |
| 5,818,625 A | 10/1998 | Forgette et al. | |
| 5,825,527 A | 10/1998 | Forgette et al. | |
| 5,863,116 A | 1/1999 | Pastrick et al. | |
| D409,540 S | 5/1999 | Muth | |
| 5,929,786 A | 7/1999 | Schofield et al. | |
| 5,959,367 A | 9/1999 | O'Farrell et al. | |
| 5,998,617 A | 12/1999 | Srinivasa et al. | |
| 6,005,724 A | 12/1999 | Todd | |
| 6,007,222 A | 12/1999 | Thau | |
| 6,020,987 A | 2/2000 | Baumann et al. | |
| 6,045,243 A | 4/2000 | Muth et al. | |
| D425,466 S | 5/2000 | Todd et al. | |
| D426,506 S | 6/2000 | Todd et al. | |
| D426,507 S | 6/2000 | Todd et al. | |
| D427,128 S | 6/2000 | Mathieu | |
| 6,076,948 A | 6/2000 | Bukosky et al. | |
| D428,372 S | 7/2000 | Todd et al. | |
| D428,373 S | 7/2000 | Todd et al. | |
| 6,086,229 A | 7/2000 | Pastrick | |
| 6,093,976 A | 7/2000 | Kramer et al. | |
| D428,842 S | 8/2000 | Todd et al. | |
| D429,202 S | 8/2000 | Todd et al. | |
| D430,088 S | 8/2000 | Todd et al. | |
| 6,106,121 A * | 8/2000 | Buckley et al. | 359/839 |
| 6,111,684 A | 8/2000 | Forgette et al. | |
| 6,142,656 A | 11/2000 | Kurth | |
| 6,163,083 A | 12/2000 | Kramer et al. | |
| 6,166,848 A | 12/2000 | Cammenga et al. | |
| 6,175,164 B1 | 1/2001 | O'Farrell et al. | |
| 6,176,602 B1 | 1/2001 | Pastrick et al. | |
| 6,222,460 B1 * | 4/2001 | DeLine et al. | 340/815.4 |
| 6,326,900 B2 * | 12/2001 | DeLine et al. | 340/815.4 |
| 6,329,925 B1 * | 12/2001 | Skiver et al. | 340/815.4 |
| 6,420,975 B1 * | 7/2002 | DeLine et al. | 340/815.4 |
| 6,426,568 B2 | 7/2002 | Turnbull et al. | |
| 6,428,172 B1 * | 8/2002 | Hutzel et al. | 359/838 |
| 6,614,579 B2 * | 9/2003 | Roberts et al. | 359/267 |
| 6,642,851 B2 * | 11/2003 | Deline et al. | 340/815.4 |
| 6,678,614 B2 * | 1/2004 | McCarthy et al. | 701/213 |
| 6,690,268 B2 * | 2/2004 | Schofield et al. | 340/438 |
| 6,774,810 B2 * | 8/2004 | DeLine et al. | 340/815.4 |

* cited by examiner

MIRROR ASSEMBLY WITH MULTI-COLOR ILLUMINATION

BACKGROUND OF THE INVENTION

Recently it has become desirable to incorporate information displays, illuminated operator interfaces and interior illuminators into the rearview mirrors of vehicles. The present invention relates to mirror assemblies with multi-color illumination.

Often times, the information displays are positioned relative to the viewer such that light rays emitted from the information display pass through a partially transmissive reflector (commonly referred to as "transflective"). Additionally, the reflector often comprises a variable reflectance such as when an electrochromic element is employed. The optimum, or desired, spectral characteristics for the light rays emitted from the display are often a function of the transmissivity and/or reflectivity of the reflector. Additionally, manufacturer and user preferences are influential in selecting spectral characteristics related to information displays.

Illuminated operator interfaces are often times provided with spectral characteristics that relate to the function that the given interface provides. For example, an emergency related illuminated operator interface may comprise light rays in a red spectrum. As with information displays, the spectral characteristics for illuminated operator interfaces are also influenced by manufacturer and user preferences.

Often times interior lighting is provided in the interior of a vehicle to illuminate the "park-reverse-neutral-drive-low" area ("PRNDL" area). The interior rearview mirror is a convenient place to add this lighting. Similarly, the interior rearview mirror is a convenient location for map lights.

What is needed is a mirror assembly with multi-color illumination such that the light rays emitted from information displays, illuminated operator interfaces and interior illuminators, or sub-combinations thereof comprise substantially the same spectral characteristics. Additionally, it is desirable to provide a mirror assembly with multi-color illumination that is user selectable.

SUMMARY OF THE INVENTION

In at least one embodiment, a mirror assembly is provided with at least one illuminated operator interface and at least one interior illuminator that emit light rays of substantially the same spectral characteristics. In a related embodiment, the spectral characteristics of the emitted light rays are operator selectable from a plurality of predetermined spectral characteristics.

In at least one embodiment an interior illumination assembly is provided that serves multiple purposes. For example, an interior illumination assembly positioned in an interior rearview mirror may function as a "park-reverse-neutral-drive-low" ("PRNDL") illuminator and/or a map light. In such embodiments, it may be desirable to have emitted light rays with first spectral characteristics for the PRNDL illuminator (such as amber, for example) and second spectral characteristics for the map light (such as white, for example).

In other embodiments, a mirror assembly is provided with at least one information display, at least one illuminated operator interface and at least one interior illuminator that emit light rays of substantially the same spectral characteristics. In a related embodiment, the spectral characteristics of the emitted light rays are selectable from a plurality of predetermined spectral characteristics.

In yet further embodiments, a mirror assembly is provided with at least two devices selected from the group comprising an information display, an illuminated operator interface and an interior illuminator that emit light rays of substantially the same spectral characteristics. In a related embodiment, the spectral characteristics of the emitted light rays are selectable from a plurality of predetermined spectral characteristics.

In yet other embodiments, a mirror assembly is provided with at least two devices selected from the group comprising an information display, an illuminated operator interface and an interior illuminator that emit light rays of substantially the same spectral characteristics along with at least one additional device selected from the group comprising an antenna, a microphone, a reflector having variable reflectance, an exterior light controller, a moisture sensor, a light sensor, a status indicator, a control circuit, a global positioning system, a compass system, a power supply, a Loran system, a wave transceiver system, and a trainable transceiver. In a related embodiment, the spectral characteristics of the emitted light rays are selectable from a plurality of predetermined spectral characteristics.

Additional advantages will become apparent when reading the detail description in light of the accompanying figures and appended claims.

DETAIL DESCRIPTION OF THE INVENTION

Rearview mirror assemblies for vehicles provide a convenient apparatus for incorporation of a number of added features. Especially with regard to interior rearview mirrors, the related universal mounting mechanisms provide the ability to incorporate a wide range of added features into associated vehicles by designing a corresponding line of rearview mirror assemblies with various features in each mirror assembly of the given line. The desired features can then be added to a given vehicle simply by selecting the corresponding mirror assembly.

Figure 1:
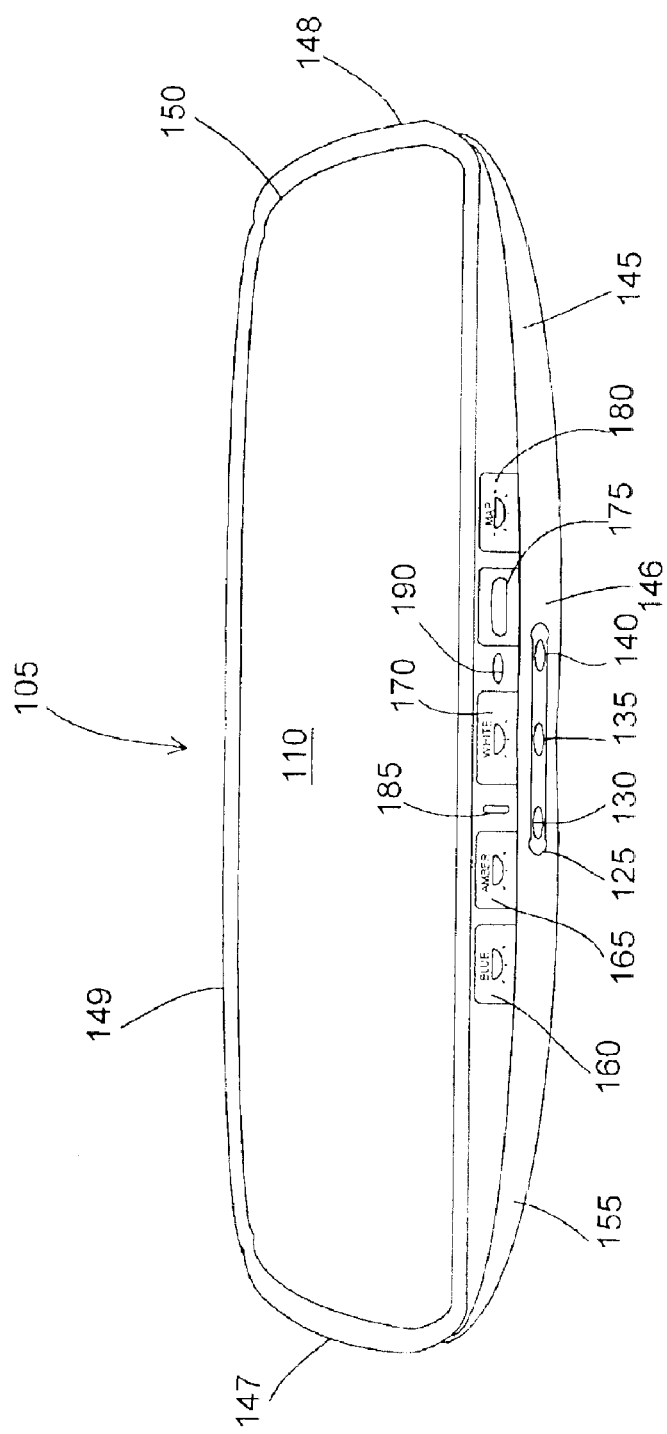
FIG. 1 depicts an embodiment of a mirror assembly comprising illuminated operator interfaces and an interior illumination assembly.

Referring initially to FIG. 1, there is shown a rearview mirror assembly 105 for a vehicle comprising a reflective element 110 within a housing defined by a mirror case 145 and a bezel 150. Although the rearview mirror assembly depicted in FIG. 1 is shown to be an interior rearview mirror, it should be understood that exterior rearview mirrors are within the scope of the present invention.

With further reference to FIG. 1, the mirror case 145 is shown to comprise an interior illumination assembly 125 having first, second and third illuminators 130, 135, 140. Although the mirror case 145 is shown in FIG. 1 to have one interior illumination assembly located near the center of the lower portion 146, it should be understood that the interior illumination assembly, or additional illumination assemblies, may be located elsewhere. For example, a first interior illumination assembly may be provided where shown in FIG. 1 with additional, second and third, interior illumination assemblies located on either side of the first illumination assembly, toward either end 147, 148. It should be understood that interior illumination assemblies may be provided on the top 149 of the mirror assembly, the bottom of the mirror assembly, the ends of the mirror assembly, the rear of the mirror assembly or in the perimeter area of the front of the mirror assembly. Additionally, it should be understood that each interior illumination assembly may incorporate one, two, three, four, five, six, seven, eight or more individual illuminators depending on the brightness of illumination desired.

Suitable individual illuminators and illumination assemblies that may be used with the present invention are disclosed in commonly assigned U.S. Pat. Nos. 5,803,579, 6,335,548, 6,441,943, 6,521,916 and 6,523,976, as well as, commonly assigned U.S. patent application Ser. Nos. 09/153,654, 09/835,238, 09/723,675, 10/078,906 and 10/230,804, the disclosures of which are incorporated in their entireties herein by reference. It should be understood that other illuminators such as incandescent, light emitting polymers, organic light emitting diodes, plasmas, gas discharge, or the like, may be employed.

With additional reference to FIG. 1, first, second, third, fourth and fifth illuminated operator interfaces 160, 165, 170, 175, 180 are provided in the bezel chin area 155. As shown, each illuminated operator interface comprises a corresponding graphic and/or alphanumeric characters. As shown in FIG. 1, the first illuminated operator interface comprises a light symbol with the word blue; the second illuminated operator interface comprises a light symbol with the word amber; the third illuminated operator interface comprises a light symbol with the word white, the fourth illuminated operator interface comprises a symbol of a mirror and the fifth illuminated operator interface comprises a light symbol with the word map. It should be understood that an illuminated operator interface, or interfaces, may be provided in the lower area 146, the ends 147, 148, the rear, the top 149 or in the perimeter portion of the front of the mirror assembly 105. It should additionally be understood that more, or less, illuminated operator interfaces may be provided in accordance with the present invention. It should be understood that operator interfaces may be provided that are not illuminated in certain embodiments or a combination of illuminated and non-illuminated operator interfaces may be provided.

In at least one embodiment, light rays emitted by the interior illumination assembly, or assemblies, and light rays emitted by the illuminated operator interface, or interfaces, comprise substantially the same spectral characteristics. In one embodiment, the spectral characteristics fall close to, or substantially on, a black body curve and have a correlated color temperature of between approximately 2000 Kelvins and approximately 20,000 Kelvins; preferably between approximately 2,800 Kelvins and approximately 15,000 Kelvins; and most preferable approximately 10,000 Kelvins. In at least one other embodiment, the correlated color temperature falls within approximate x=0.42 and approximately x=0.48 and approximately y=0.37 and approximately y=0.415 with respect to The Commission International d'Eclairage (CIE)1931 chromaticity diagram; most preferably the correlated color temperature falls substantially on the "Source A" designation.

In at least one embodiment, the spectral characteristics of the light rays emitted by the interior illumination assembly, or assemblies, and light rays emitted by the illuminated operator interface, or interfaces, are selectable from at least two, and preferably at least three, predetermined spectral characteristics in the visible spectrum. In at least one embodiment, a first one of the predetermined spectral characteristics is between approximately 470 nm and approximately 520 nm and a second one of the predetermined spectral characteristics is between approximately 570 nm and approximately 615 nm. In at least one other embodiment, a first one of the predetermined spectral characteristics is between approximately 615 nm and approximately 670 nm, a second one of the predetermined spectral characteristics is between approximately 500 nm and approximately 520 nm and a third one of the predetermined spectral characteristics is between approximately 460 nm and approximately 480 nm.

With further reference to FIG. 1, the first illuminated operator interface may be configured to activate the interior illumination assembly to emit light rays comprising a first spectral characteristic, the second illuminated operator interface may be configured to activate the interior illumination assembly to emit light rays comprising a second spectral characteristic and the third illuminated operator interface may be configured to activate the interior illumination assembly to emit light rays comprising a third spectral characteristic. In at least one embodiment, the fifth illuminated operator interface may be configured to activate the interior illumination assembly to emit light rays comprising a spectral characteristic substantially like the third illuminated operator interface with a higher brightness.

It should be understood that any given illuminated operator interface, or interfaces, may be configured to provide a different function based upon the manner in which the illuminated operator interface is manipulated. For example, in an embodiment where the given illuminated operator interface is a push button, it may be depressed for various lengths of time to provide different functions or it may be depressed and released in succession within a given period of time to provide a specific function. For example, the illuminated operator interface may be pressed momentarily to change all the illuminated operator interfaces to a common spectral characteristic and may be pressed for a longer time to activate an interior illumination assembly, or assemblies, to emit light rays of a specific spectral characteristic.

In a preferred embodiment, each of the first, second and third illuminated operator interfaces as shown in FIG. 1 is configured to activate the interior illumination assembly to emit light rays having a spectral characteristic comprising predominantly blue, amber and white, respectively. The fifth illuminated operator interface is configured to activate the interior illumination assembly in a spectral characteristic emitting white light with a higher intensity than when the third illuminated operator interface is used. In a related preferred embodiment, each illuminated operator interface as shown in FIG. 1 is configured as a push button and configured such that the interior illumination assembly is activated when either the first, second, third or fifth illuminated operator interface is pressed momentarily. When the first, second or third button is pressed for a longer period of time, all of the illuminated operator interfaces will emit light rays of a spectral characteristic associated with the specific push button that is depressed. When the interior illumination assembly is activated by depressing either a first, second or third illuminated operator interface, depressing any one of the first, second, or third illuminated operator interfaces will deactivate the interior illumination assembly; if the fifth illuminated operator interface is depressed when the interior illumination assembly has been activated via a first, second or third illuminated operator interface, the interior illumination assembly will change to the intensity and spectral characteristic associated with the fifth illuminated operator interface. When the interior illumination assembly is activated by depressing the fifth illuminated operator interface, depressing the fifth illuminated operator interface a second time will deactivate the interior illumination assembly; depressing either the first, second or third illuminated operator interface will change the light rays emitted by the interior illumination assembly to the spectral characteristic associated with the given illuminated operator interface depressed. In at least one other embodiment, only the illuminated operator interface depressed to activate a given interior illumination assembly, or assemblies, will deactivate the interior illumination assembly, or assemblies; any other illuminated operator interface will change the spectral characteristics and/or brightness.

With further reference to FIG. 1, the fourth illuminated operator interface 175 may be configured to activate or deactivate automatic control of a variable reflectance reflector 110. In at least one embodiment, the reflector 110 is a variable reflectance reflector, such as one incorporating an electrochromic element. Status indicator 185 may be configured to indicate the status of the variable reflectance reflector when so incorporated.

A light sensor 190 is shown to be incorporated into the mirror assembly. Light sensor 190 may be used to automatically control the variable reflectance reflector and/or may be used to automatically control the brightness and/or on/off control of the illuminated operator interface, or interfaces, and/or the interior illumination assembly, or assemblies. In at least one embodiment, the illuminated operator interface, or interfaces, and/or the interior illuminator, or illuminators, may be configured to automatically turn on/off as a function of a light sensed based upon a threshold value. The light sensed may be either by an ambient sensor, a glare sensor, a sky sensor, a sun load sensor, or any combination thereof. At least one of the illuminated operator interfaces may be configured to turn on/off the automatic control.

It should be understood that any given illuminated operator interface may be configured as a pushbutton, a slide bar switch, a toggle switch, a "thumb-wheel" switch (such as a variable potentiometer), a rotary switch, a "rocker" switch and a "latching" pushbutton (such that the pushbutton is latched by depressing and releasing it once, then unlatched by depressing and releasing it again).

Suitable operator interfaces that may be used with the present invention are described in detail in commonly assigned U.S. Pat. Nos. 6,407,468, 6,420,800, 6,426,568 and 6,471,362, as well as, in commonly assigned U.S. Patent Application Publication No. 2002/0024713 A1, the disclosures of which are incorporated in their entireties herein by reference. The illuminated portions of the illuminated operator interfaces may be as described in commonly assigned U.S. Pat. No. 6,170,956, the disclosure of which is incorporated in its entirety herein by reference. It should be understood that many alternate operator interfaces may be incorporated into the present invention.

Figure 2:
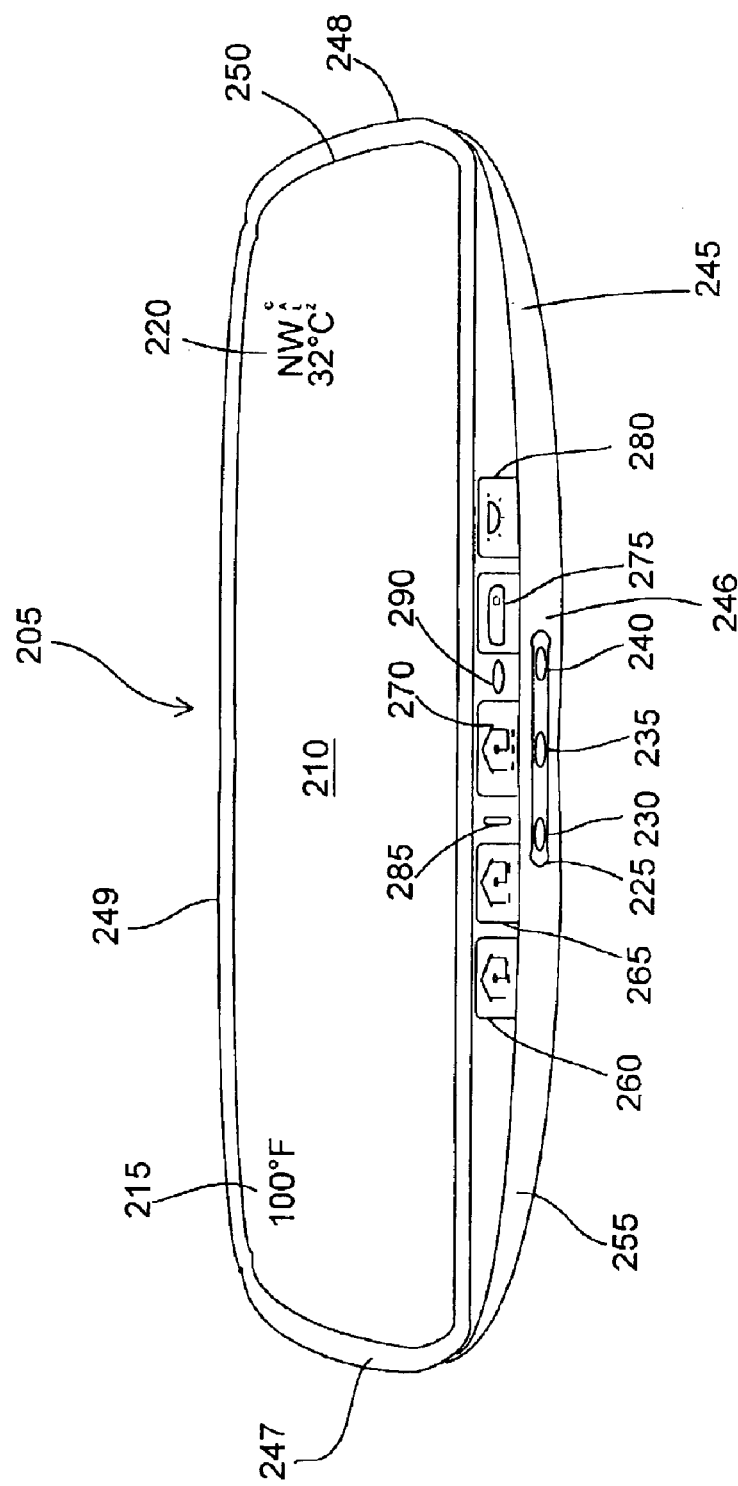
FIG. 2 depicts an embodiment of a mirror assembly comprising illuminated operator interfaces, an interior illumination assembly and information displays.

Turning now to FIG. 2, there is shown a mirror assembly 205 comprising first and second information displays 215, 220. In at least one embodiment, an information display is, or displays are, positioned behind a reflector 210 with respect to a viewer. In a preferred embodiment, the reflector comprises at least a portion that is transflective such that light rays emitted from the information display pass through the transflective portion. In one embodiment, the reflector is transflective and incorporates a variable reflectance such as with an electrochromic element.

Suitable information displays that may be used with the present invention are disclosed in commonly assigned U.S. Pat. Nos. 6,170,956 and 6,441,943, U.S. patent application Ser. No. 10/036,627, U.S. Patent Application Publication No. 2002/0154379 and U.S. Patent Application No. 60/446,872 the disclosures of which are incorporated in their entireties herein by reference. It should be understood that any suitable vacuum florescent display, back lit liquid crystal display, negative mode back lit liquid crystal display, positive mode back lit liquid crystal display, segmented light emitting diode display, matrix light emitting diode display, organic light emitting diode display, liquid crystal display, backlit indicia display, plasma display, gas discharge display, or the like may be employed.

With further reference to FIG. 2, the mirror assembly 205 incorporates an interior illumination assembly 225 with first, second and third illuminators 230, 235, 240, located in the center lower portion 246. The mirror assembly further comprises a mirror housing defined by a mirror case 245 and a bezel 250. It should be understood that the interior illumination assembly 225, or additional interior illumination assemblies may be incorporated within the mirror assembly on either side of the center lower portion 246, toward the ends 247, 248, on the top 249, the rear, or in the perimeter portion of the front.

Referring further to FIG. 2, mirror assembly 205 is shown to include first, second, third, fourth and fifth illuminated operator interfaces 260, 265, 270, 275, 280 within the bezel chin area 255. First, second and third illuminated operator interfaces provide "HOMELINK™", or other trainable transceiver, functions, such as, unlocking and/or locking home doors, opening and/or closing garage doors, turning on and/or off home lighting, etc. The first, second and third illuminated operator interfaces may also be configured to function as interior illumination assembly and/or information display operators. As can be seen in FIG. 2, the fourth illuminated operator interface has a symbol within the mirror symbol which represents information displays. The fourth illuminated operator interface may be further configured, in addition to reflector control, to control the status of an associated information display, or displays. For example, the fourth illuminated operator interface may be configured such that it is a push button. Depressing the fourth illuminated operator interface momentarily will turn on, or off, the automatic control of the reflector; depressing the fourth illuminated operator interface for a longer period of time will turn on, off, or dim an associated information display, or displays. The information display, or displays, may be configured such that the spectral characteristics of the emitted light rays are changed when the first, second or third illuminated operator interfaces are configured as described with respect to FIG. 1 in regard to the illuminated operator interfaces and interior illumination assemblies.

In at least one embodiment, light rays emitted by the interior illumination assembly, or assemblies, and light rays emitted by the illuminated operator interface, or interfaces, and light rays emitted by the information display, or displays, comprise substantially the same spectral characteristics. In at least one embodiment, the spectral characteristics fall close to, or on, a black body curve and have a correlated color temperature of between approximately 2000 Kelvins and approximately 20,000 Kelvins; preferably between approximately 5,000 Kelvins and approximately 15,000 Kelvins; and most preferable approximately 10,000 Kelvins. In at least one other embodiment, the correlated color temperature falls within approximate x=0.42 and approximately x=0.48 and approximately y=0.37 and approximately y=0.415 with respect to The Commission International d'Eclairage (CIE)1931 chromaticity diagram; most preferably the correlated color temperature falls substantially on the "Source A" designation.

In at least one embodiment, the spectral characteristics of the light rays emitted by the interior illumination assembly, or assemblies, and light rays emitted by the illuminated operator interface, or interfaces, and light rays emitted by the information display, or displays, are selectable from at least two, and preferably at least three, predetermined spectral characteristics. In one embodiment, a first one of the predetermined spectral characteristics is between approximately 470 nm and approximately 520 nm and a second one of the predetermined spectral characteristics is between approximately 570 nm and approximately 615 nm. In at least one other embodiment, a first one of the predetermined spectral characteristics is between approximately 615 nm and approximately 670 nm, a second one of the predetermined spectral characteristics is between approximately 500 nm and approximately 520 nm and a third one of the predetermined spectral characteristics is between approximately 460 nm and approximately 480 nm.

With further reference to FIG. 2, the first illuminated operator interface may be configured to activate an information display to emit light rays comprising a first spectral characteristic, the second illuminated operator interface may be configured to activate an information display to emit light rays comprising a second spectral characteristic and the third illuminated operator interface may be configured to activate an information display to emit light rays comprising a third spectral characteristic. In at least one embodiment, any two of at least one information display, at least one interior illumination assembly and at least one illuminated operated interface are configured to emit light rays comprising substantially the same spectral characteristics.

With further reference to FIG. 2 a light sensor 290 is shown to be incorporated into the mirror assembly. Light sensor 290 may be used to automatically control the variable reflectance reflector and/or may be used to automatically control the brightness and/or on/off control of the illuminated operator interface, or interfaces, and/or the interior illumination assembly, or assemblies. In at least one embodiment, the illuminated operator interface, or interfaces, and/or the interior illuminator, or illuminators, may be configured to automatically turn on/off as a function of a light sensed based upon a threshold value. The light sensed may be either by an ambient sensor, a glare sensor, a sky sensor, a sun load sensor, or any combination thereof. At least one of the illuminated operator interfaces may be configured to turn on/off the automatic control.

With further reference to FIG. 2, the fourth illuminated operator interface 275 may be configured to activate or deactivate automatic control of a variable reflectance reflector 210 and/or an information display, or displays, 215, 220. In at least one embodiment, the reflector 210 is a variable reflectance reflector, such as one incorporating an electrochromic element. Status indicator 285 may be configured to indicate the status of the variable reflectance reflector when so incorporated.

It should be understood that additional interior illumination assemblies and/or exterior illumination assemblies and/or additional information displays may be controlled to emit light rays of substantially the same spectral characteristics as the illumination assemblies and/or information displays and/or illuminated operator interfaces within the rearview mirror. The operator interfaces provided in the mirror, or elsewhere in, or on, the vehicle may be configured to control these additional illumination assemblies and/or additional information displays and/or additional illuminated operator interfaces. It should be understood that the individual illumination assemblies may be configured to be controlled via the vehicle bus, such as a CAN bus, a wireless control bus, such as a BLUETOOTH™ system, a standard serial or parallel digital bus, or may be hard wired via a wiring harness. The additional illumination assemblies and/or illuminated operator interfaces and/or information displays may be provided in the vehicle console, may be incorporated into exterior rearview mirrors, the headliner, incorporated into the visor(s), incorporated into door panels (either directed toward the interior or located at a lower portion of a door or bottom of a door to provide a ground illuminator), may be located in the A-pillars within the vehicle, the B-pillars within a vehicle, the C-pillars within a vehicle, incorporated into center consoles, incorporated into the dash board, incorporated into the instrument panel, the steering wheel, incorporated into the radio, placed in the glove compartment, incorporated into seats, heater controls, air conditioning controls, defroster controls, vent controls, defogger controls, and may be provided at any other point within, or upon the exterior of, a vehicle.

The present invention has been described as incorporating an electrochromic mirror element within the mirror housing of the inventive rearview mirror assembly. It will be appreciated by those skilled in the art that various other vehicle accessories and components may be incorporated in the rearview mirror assembly in whole or in part and in various combinations. Such vehicle accessories and components may be mounted within, on or to the mirror housing, the mirror mount, an attachment to the mirror mount or housing, or in a console or other housing associated with the rearview mirror assembly. Additionally, any such vehicle accessories may share components with one another, such as processors, sensors, power supplies, wire harnesses and plugs, displays, switches, antennae, etc. Examples of other vehicle accessories, components or features are described further below.

Figure 3:
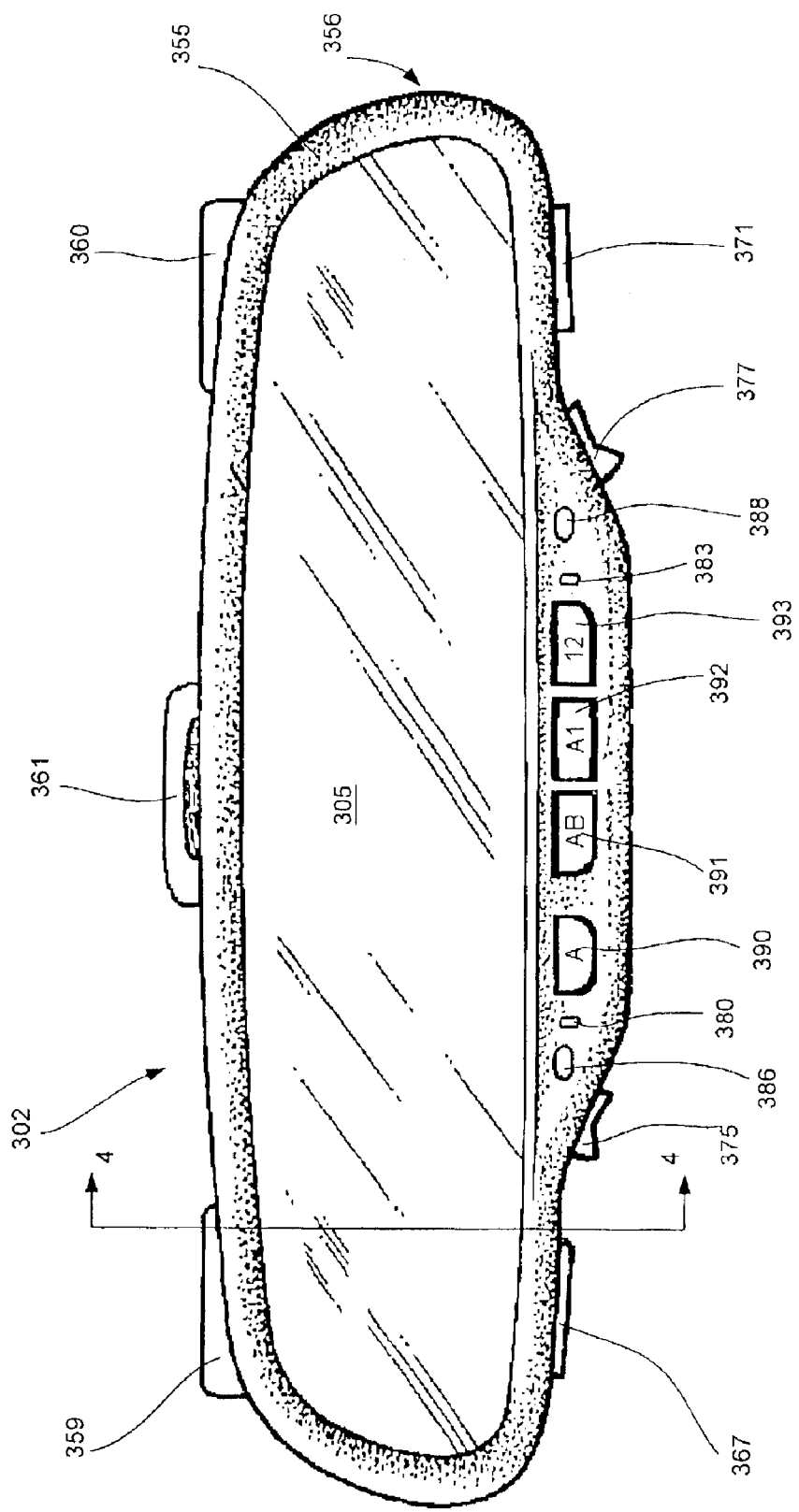
FIG. 3 depicts an embodiment of a mirror assembly incorporating a host of added features.

Turning now to FIG. 3, a mirror assembly 302 is shown to comprise a bezel 355 and a case 356. The bezel and the case combine to define the mirror housing for incorporation of features in addition to a reflective element and information displays. Commonly assigned U.S. Pat. Nos. 6,102,546, D410,607, 6,407,468, 6,420,800, and 6,471,362, the disclosures of which are incorporated in their entireties herein by reference, describe examples of various bezels, cases and associated button construction that may be used with the present invention.

Figure 4:
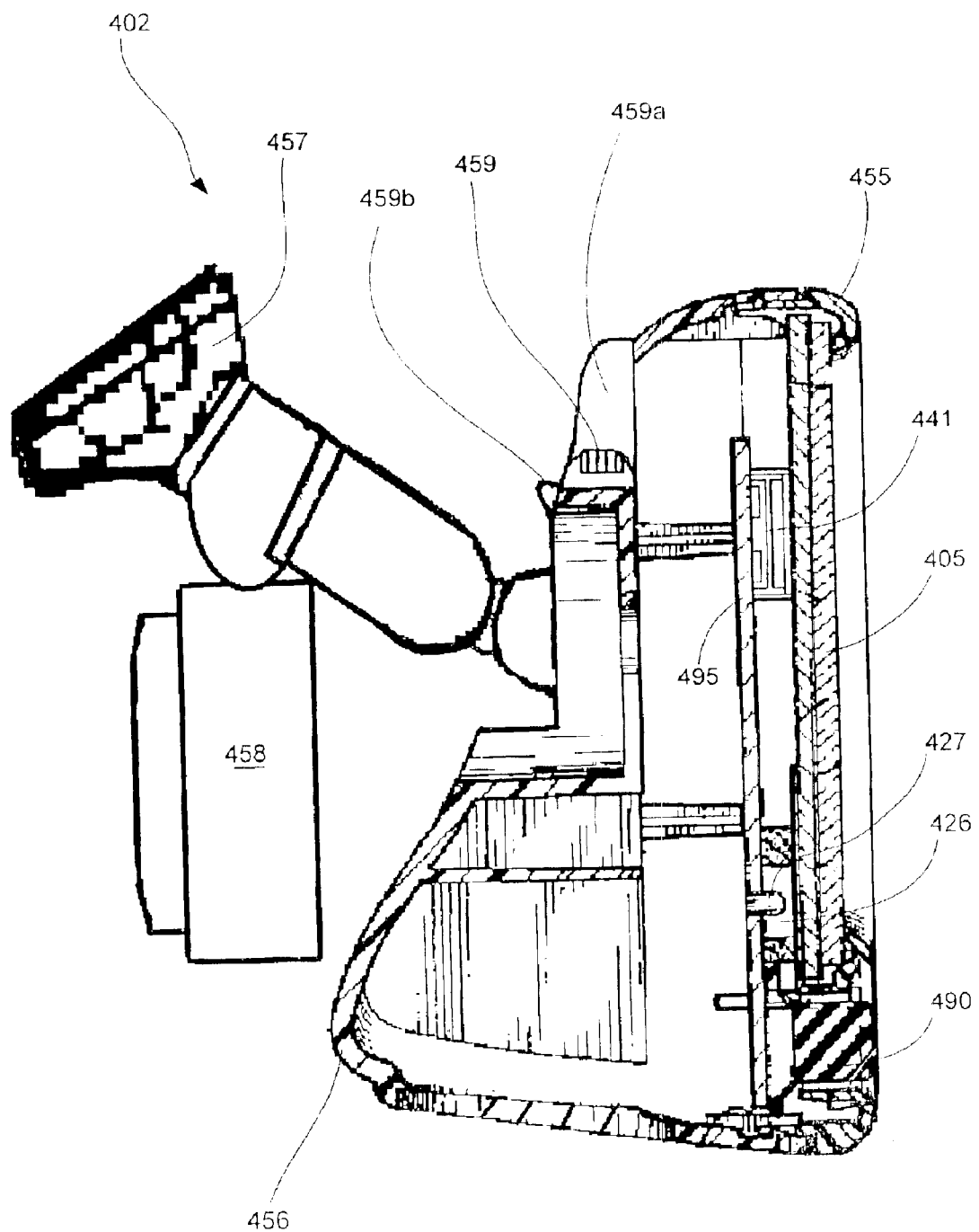
FIG. 4 depicts a sectional view of the mirror assembly as in FIG. 3 taken along the section line 4—4.
Figure 5:
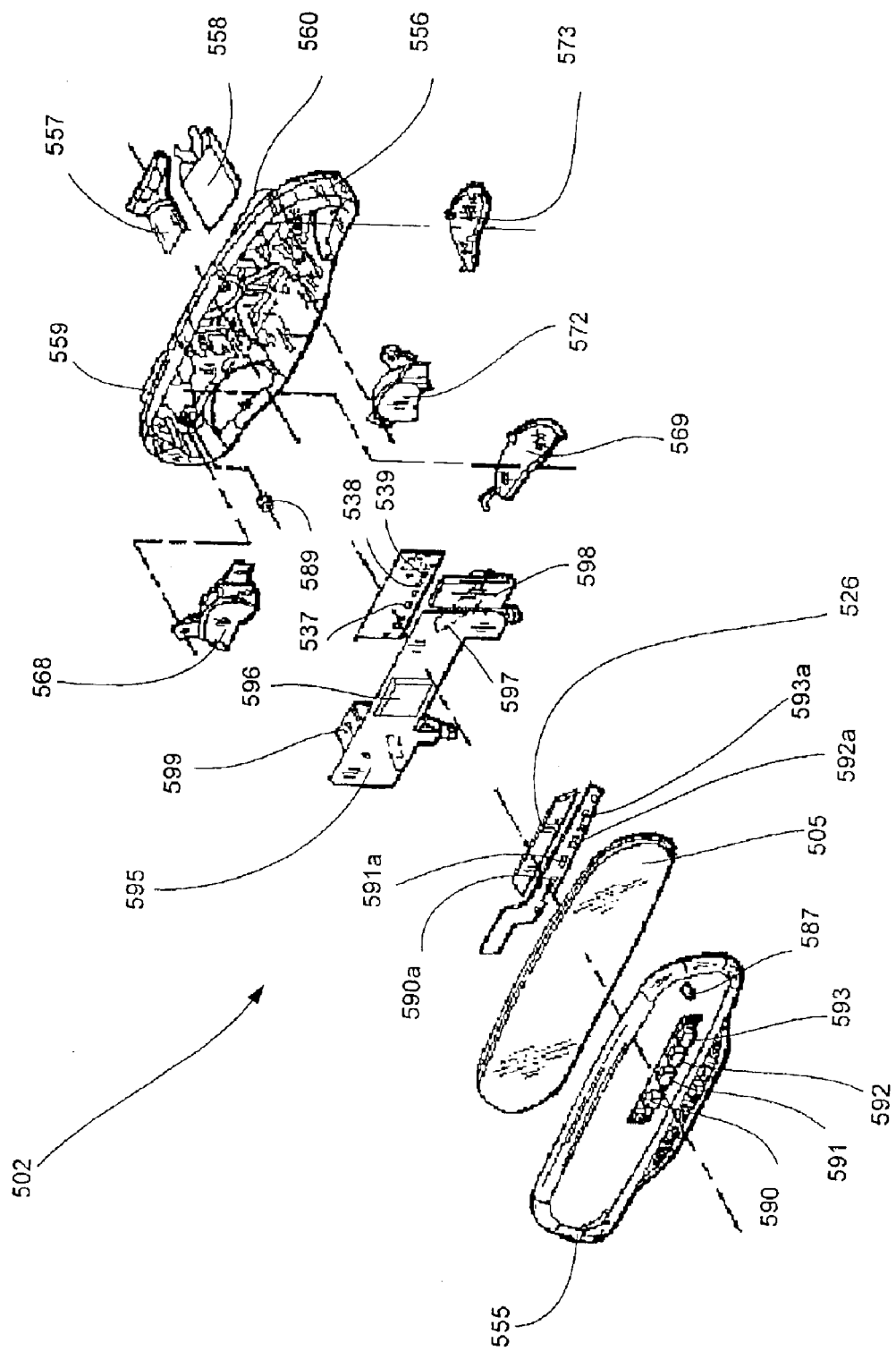
FIG. 5 depicts an exploded view of a mirror assembly.

As depicted in FIG. 3, the mirror assembly may comprise first and second microphones 359, 360. Examples of microphones for use with the present invention are described in commonly assigned U.S. patent application Ser. Nos. 09/444,176 and 09/724,119, U.S. Patent Application Publication No. US 2002/0110256 A1, and PCT Application No. PCT/US02/32386, the disclosures of which are incorporated in their entireties herein by reference. As depicted in FIGS. 3, 4 and 5, the microphone or microphones may be mounted on the top of the mirror assembly, on the bottom of the mirror assembly, on the backside of the mirror case, or any where within the mirror case or bezel. Preferably, two microphones are incorporated, one near each end, into the mirror assembly on the backside of the mirror case within recessed portion 459a and having an acoustic dam 459b as shown in FIGS. 3, 4 and 5. These systems may be integrated, at least in part, in a common control with information displays and/or may share components with the information displays. In addition, the status of these systems and/or the devices controlled thereby may be displayed on the associated information displays.

With further reference to FIG. 3, mirror assembly 302 may include first and second illumination assemblies 367, 371. Various illumination assemblies and illuminators for use with the present invention are described in commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference. As further depicted in FIG. 5, each illumination assembly preferably comprises a reflector, a lens and an illuminator (not shown). There may be two illumination assemblies generally positioned to illuminate a front passenger seat area and the second generally positioned to illuminate a driver seat area. Alternatively, there may be only one illumination assembly that illuminates both seat areas and/or there may be additional illuminator assemblies such as one to illuminate a center console area, overhead console area or an area between the front seats.

With further reference to FIG. 3, mirror assembly 302 includes first and second switches 375, 377. Suitable switches for use with the present invention are described in detail in commonly assigned U.S. Pat. Nos. 6,407,468, 6,420,800, 6,426,568, and 6,471,362, as well as, commonly assigned U.S. Patent Application Publication No. US 2002/0024713 A1, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, an exterior light controller, a moisture sensor, a tire pressure monitoring system, a navigation system, a lane departure warning system, an adaptive cruise control system, etc. Any other display or system described herein or within the references incorporated by reference may be incorporated in any location within the associated vehicle and may be controlled using the switches.

With further reference to FIG. 3, mirror assembly 302 includes first and second indicators 380, 383. Various indicators for use with the present invention are described in commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

With further reference to FIG. 3, mirror assembly 302 may include first and second light sensors 386, 388 (glare and ambient sensors 587, 589 in FIG. 5). Preferred light sensors for use within the present invention are described in detail in commonly assigned U.S. Pat. Nos. 5,923,027, 6,313,457, 6,359,274, 6,379,013, and 6,402,328, U.S. Patent Application Publication No. US 2002/0056806 A1, and in U.S. patent application Ser. No. 10/068,540, the disclosures of which are incorporated in their entireties herein by reference. The glare sensor and/or ambient sensor automatically control the reflectivity of a self dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays. The mirror assembly may further include sun-load sensors for sensing light levels towards the driver side and passenger side of the vehicle so as to control the climate control system of the vehicle.

With further reference to FIG. 3, mirror assembly 302 may include first, second, third and fourth operator interfaces 390, 391, 392, 393 located in mirror bezel 355. Each operator interface is shown to comprise a backlit information display "A," "AB," "A1" and "12". It should be understood that these operator interfaces can be incorporated any where in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, and 6,471,362, as well as, commonly assigned U.S. Patent Application Publication No. US 2002/0024713 A1, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 3, it should be understood that fewer or more individual devices may be incorporated in any location within the associated vehicle and as described within the references incorporated herein.

Turning now to FIG. 4 there is shown a section view of a mirror assembly 402. The depicted section of FIG. 4 is taken along cut line 4—4 of FIG. 3. FIG. 4 shows a preferred positional relationship of third and fourth information displays 426, 441 with respect to reflective element 405 along with third information display backlighting 427 within a housing defined by case 456 and bezel 455. Mirror assembly 402 is also shown to comprise a microphone 459; first operator interface 490; along with circuit board 495; mirror mount 457 and accessory module 458. The mirror mount 457 and/or an accessory module 458 may comprise compass sensors, a camera, a headlight control, an additional microprocessor, a rain sensor, additional information displays, additional operator interfaces, etc.

Electrochromic medium that may be used with the present invention is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium that may be used with the present invention preferably includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIAL HAVING A SOLUBLIZING MOIETY"; U.S. patent application Ser. No. 09/302,866 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. Pat. No. 6,195,192 entitled "ELECTROCHROMIC MATERIALS WITH ENHANCED ULTRAVIOLET STABILITY"; U.S. patent application Ser. No. 6,392,783 entitled "SUBSTITUTED METALLOCENES FOR USE AS AN ANODIC ELECTROCHROMIC MATERIAL AND ELECTROCHROMIC MEDIA AND DEVICES COMPRISING SAME", and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCTNWO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

First and second substantially transparent substrates incorporated into reflector 405 may be any material which is transparent and has sufficient strength to be able to operate in the environmental conditions to which the device will be exposed. The substrates may comprise any type of borosilicate glass, soda lime glass, float glass, or any other material, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. The element 405 preferably comprises individual substrates made from sheets of glass.

Additionally, substrates incorporated into the reflector 405 may be treated or coated as is described in U.S. Pat. No. 6,239,898 entitled "ELECTROCHROMIC STRUCTURES," U.S. Pat. No. 6,193,378 entitled "AN ELECTROCHROMIC DEVICE HAVING A SELF-CLEANING HYDROPHILIC COATING," and U.S. patent application Ser. No. 09/602,919 entitled "AN ELECTRO-OPTIC DEVICE HAVING A SELF-CLEANING HYDROPHILIC COATING," filed on Jun. 23, 2000, the entire disclosures of which are incorporated herein by reference. Other treatments, such as anti-reflectance coatings, hydrophilic coatings, low-E coatings, and UV-blocking layers are also envisioned. Also, such coatings may be applied to element 405 in this and other embodiments.

Commonly assigned U.S. Pat. Nos. 5,940,201, 6,193,379, 6,195,194, 6,246,507, and U.S. patent application Ser. No. 10/260,741, the disclosures of which are incorporated in their entireties herein by reference, describe a host of reflective elements for use with the present invention. It should be understood that the specific reflective element configuration as depicted in FIG. 4 is one embodiment and that a plurality of embodiments are disclosed herein and in the references incorporated herein by reference.

Turning now to FIG. 5, there is shown an exploded view of a mirror assembly 502. FIG. 5 provides additional detail with regard to one preferred positional relationship of individual components, as well as, providing additional structural detail of a mirror assembly. Mirror assembly 502 comprises a reflective element 505 within a bezel 555 and a mirror case 556. A mirror mount 557 is included for mounting the mirror assembly within a vehicle. It should be understood that a host of accessories may be incorporated into the mount 557 such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 502 is shown in FIG. 5 to further comprise third information display 526 with third information display backlighting 537, 538, 539; first and second microphones 559, 560; a first reflector 568 with a first lens 569; a second reflector 572 with a second lens 573; a glare sensor 587; an ambient light sensor 589; first, second, third and fourth operator interfaces 590, 591, 592, 593 with first, second, third and fourth operator interface backlighting 590a, 591a, 592a, 593a; a circuit board 595 having a compass sensor module 599; and a daughter board 598 with an input/output bus interface 597.

The first reflector 568 combines with the first lens 569 and a first light source (not shown) to form a first illumination assembly. The second reflector 572 combines with the second lens 573 and a second light source (not shown) to form a second illumination assembly. Preferably, the illumination assemblies with associated light source are constructed in accordance with the teachings of commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference.

Preferably, the glare light sensor 587 and the ambient light sensor 589 are active light sensors as described in commonly assigned U.S. Pat. Nos. 6,359,274 and 6,402,328, the disclosures of which are incorporated in their entireties herein by reference. The electrical output signal from either, or both, of the sensors 587, 589 may be used as inputs to a controller 596 to control the reflectivity of reflective element 505 and, or, the intensity of third information display backlighting 527. The details of various control circuits for use herewith are described in commonly assigned U.S. Pat. Nos. 5,883,605, 5,956,012, 6,084,700, 6,222,177, 6,224,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 599 is shown to be mounted to circuit board 595 in FIG. 5, it should be understood that the sensor module may be located within mount 557, an accessory module 558 positioned proximate mirror assembly 502 or at any location within an associated vehicle such as under a dash board, in an overhead console, a center console, a trunk, an engine compartment, etc. Commonly assigned U.S. Pat. Nos. 6,023,229 and 6,140,933, as well as, commonly assigned U.S. patent application Ser. Nos. 09/989,559, 10/210,910 60/360,723, and 10/210,910 entitled Electronic Compass System, the disclosures of which are incorporated in their entireties herein by reference, describe in detail various compass systems for use with the present invention. These systems may be integrated, at least in part, in a common control with information displays and/or may share components with the information displays. In addition, the status of these systems and/or the devices controlled thereby may be displayed on the associated information displays.

Daughter board 598 is in operational communication with circuit board 595. Circuit board 595 may comprise a controller 596, such as a microprocessor, and daughter board 598 may comprise an information display (not shown in FIG. 5). The microprocessor may, for example, receive signal(s) from the compass sensor module 599 and process the signal(s) and transmit signal(s) to the daughter board to control a display to indicate the corresponding vehicle heading. As described herein and within the references incorporated by reference herein, the controller may receive signal(s) from light sensor(s), rain sensor(s) (not shown), automatic vehicle exterior light controller(s) (not shown), microphone(s), global positioning systems (not shown), telecommunication systems (not shown), operator interface(s) and a host of other devices, and control the information display(s) to provide appropriate visual indications.

Controller 596 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor based voice actuation systems, and vehicle speed. The controller 596 (or controllers) may receive signals from switches and or sensors associated with any of the devices described herein and in the references incorporated by reference herein to automatically manipulate any other device described herein or described in the references included by reference. The controller 596 may be, at least in part, located outside the mirror assembly or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, and 6,379,013, U.S. Patent Application Publication No. US 2002/0005472 A1 and U.S. patent application Ser. Nos. 09/528,389, 09/678,586, 09/800,460, 60/404,879, 60/394,583, 10/235,476, and 10/208,142, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457 and U.S. patent application Ser. Nos. 09/970,728 and 09/970,962, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The mirror assembly may further include one or more antennae for receipt and/or transmission of RF signals. Appropriate receiving, transmitting, and/or processing circuitry may further be included in or attached to the mirror assembly. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in a rearview mirror assembly are disclosed in commonly assigned U.S. Pat. Nos. 6,215,389 and 6,431,712 and in U.S. patent application Ser. Nos. 09/359,144 and 09/949,955, the entire disclosures of which are incorporated herein by reference. Examples of a GPS system incorporated in a rearview mirror assembly are disclosed in commonly assigned U.S. Pat. Nos. 6,166,698, 6,297,781, 6,396,446, and in U.S. Patent Published Application No. US 2002/0032510 A1, the entire disclosures of which are incorporated herein by reference. An example of a LORAN system incorporated in a rearview mirror assembly is disclosed in commonly assigned U.S. Patent Application Publication No. US 2002/0193946 A1, the entire disclosure of which is incorporated herein by reference. An example of both telephone/telematics system and a BLUETOOTH™ system incorporated in a rearview mirror assembly is disclosed in commonly assigned U.S. Patent Application No. US 2002/0032510 A1, the entire disclosure of which is incorporated herein by reference. Examples of a trainable garage door opening systems and RKE systems incorporated in a rearview mirror assembly are disclosed in U.S. Pat. No. 6,091,343, the entire disclosures of which are incorporated herein by reference. The mirror may further include an infrared (IR) transmitter/receiver for transmitting/receiving information to and from the mirror assembly and possibly to and from the vehicle. An example of such a rearview mirror assembly is disclosed in commonly-assigned U.S. Pat. No. 6,407,712, the entire disclosure of which is incorporated herein by reference.

The mirror assembly may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly-assigned U.S. Pat. No. 6,346,698 may be used. The entire disclosure of which is incorporated herein by reference. Examples of backlit indicia panel displays are disclosed in commonly-assigned U.S. Pat. Nos. 6,170,956 and 6,356,376 and in U.S. patent application Ser. Nos. 09/586,813 and 09/664,151, the entire disclosures of which are incorporated herein by reference. Various displays used in rearview mirrors are disclosed in commonly-assigned U.S. Pat. No. 6,356,376 and in U.S. Patent Application Publication No. US 2002/0154379 A1, the entire disclosures of which are incorporated herein by reference.

The wiring for the vehicle accessories in the rearview mirror assembly housing may be run through the mounting bracket and along the windshield (if the mounting bracket does not already extend to the headliner) under a channel mount. An example of a rearview mirror assembly in which the wiring for accessories in the mirror assembly housing are routed through the mounting bracket is disclosed in commonly-assigned U.S. Pat. No. 6,467,919, the entire disclosure of which is incorporated herein by reference.

The description of the invention contained herein is intended to be representative of a best of mode of practicing the invention and in no way should be limited to the embodiments described. To the contrary, the embodiments described herein should be construed to include all equivalent structures and functions.

What is claimed is:

1. A mirror assembly, comprising:
   at least one information display;
   at least one interior illuminator; and
   at least one illuminated operator Interface, wherein light rays emitted from said at least one information display, light rays emitted from said at least one interior illuminator, and light rays emitted from said at least one illuminated operator interface comprise substantially the same spectral characteristics.

2. A mirror assembly as in claim 1 wherein said substantially the same spectral characteristics are operator selectable.

3. A mirror assembly as in claim 1 wherein said substantially the same spectral characteristics are operator selectable from at least two predetermined spectral characteristics.

4. A mirror assembly as in claim 3 wherein a first one of said at least two predetermined spectral characteristics is between approximately 470 nm and approximately 520 nm.

5. A mirror assembly as in claim 3 wherein a first one of said at least two predetermined spectral characteristics is between approximately 570 nm and approximately 615 nm.

6. A mirror assembly as in claim 5 wherein a second one of said at least two predetermined spectral characteristics is between approximately 470 nm and approximately 520 nm.

7. A mirror assembly as in claim 3 wherein a first one of said at least two predetermined spectral characteristics falls substantially on a black body curve.

8. A mirror assembly as in claim 7 wherein said first one of said two predetermined spectral characteristics has a correlated color temperature between approximately 2000 Kelvins and approximately 20,000 Kelvins.

9. A mirror assembly as in claim 3 wherein a first one of said at least two predetermined spectral characteristics falls substantially on a black body curve.

10. A mirror assembly as in claim 9 wherein said first one of said et least two predetermined spectral characteristics has a correlated color temperature between approximately 2000 Kelvins and approximately 20,000 Kelvins.

11. A mirror assembly as in claim 3 wherein said substantially the same spectral characteristics are operator selectable from at least three predetermined spectral characteristics.

12. A mirror assembly as in claim 11 wherein a first one of said at least three predetermined spectral characteristics is between approximately 615 nm and approximately 670 nm.

13. A mirror assembly as in claim 11 wherein a first one of said at least three predetermined spectral characteristics is between approximately 500 nm and approximately 520 nm.

14. A mirror assembly as in claim 11 wherein a first one of said at least three predetermined spectral characteristics is between approximately 460 nm and approximately 480 nm.

15. A mirror assembly as in claim 11 wherein a first one of said at least three predetermined spectral characteristics falls substantially on a black body curve.

16. A mirror assembly as in claim 15 wherein said third one of said three predetermined spectral characteristics has a correlated color temperature between approximately 2000 Kelvins and approximately 20,000 Kelvins.

17. A mirror assembly as in claim 11 wherein a first one of said at least three predetermined spectral characteristics falls substantially on a black body curve.

18. A mirror assembly as in claim 17 wherein said first one of said at least three predetermined spectral characteristics has a correlated color temperature between approximately 2000 Kelvins and approximately 20,000 Kelvins.

19. A mirror assembly as in claim 1 wherein said at least one illuminated operator interface is selected from the group comprising a pushbutton, a momentary pushbutton, a slide bar switch, a toggle switch, a "thumb-wheel" switch (such as a variable potentiometer), a rotary switch, a "rocker" switch and a "latching" pushbutton.

20. A mirror assembly as in claim 1 further comprising at least one device selected from the group comprising a voice activated system, a trainable transceiver, a microphone, a compass sensor, a compass system, a telephone system, a highway toll booth interface, a telemetry system, an exterior light controller, a moisture sensor, a loran system, a global positioning system, a variable reflectance reflector, a vehicle vision system, an accessory module, a remote keyless entry system, a wireless communication interface, a CAN bus interface, a serial bus interface, a parallel bus interface, a light sensor, a camera, a climate control system, a power supply, a controller, a transflective reflector, a tire pressure monitoring system, a navigation system, a lane departure warning system, and an adaptive cruise control system.

21. A mirror assembly as in claim 1 where said information display is selected from the group comprising a vacuum florescent display, a segmented light emitting diode display, a matrix light emitting diode display, an organic light emitting diode display, a liquid crystal display, a back lit liquid crystal display, a negative mode liquid crystal display, a positive mode liquid crystal display, a backlit indicia display, a plasma display, and a gas discharge display.

22. A mirror assembly, comprising:
at least one interior illuminator; and
at least one illuminated operator interface, wherein light rays emitted from said at least one interior illuminator and light rays emitted from said at least one illuminated operator interface comprise substantially the same spectral characteristics.

23. A mirror assembly as in claim 22 wherein said substantially the same spectral characteristics are operator selectable.

24. A mirror assembly as in claim 22 wherein said substantially the same spectral characteristics are operator selectable from at least two predetermined spectral characteristics.

25. A mirror assembly as in claim 24 wherein a first one of said at least two predetermined spectral characteristics is between approximately 470 nm and approximately 520 nm.

26. A mirror assembly as in claim 24 wherein a first one of said at least two predetermined spectral characteristics is between approximately 570 nm and approximately 615 nm.

27. A mirror assembly as in claim 26 wherein a second one of said at least two predetermined spectral characteristics is between approximately 470 nm and approximately 520 nm.

28. A mirror assembly as in claim 22 wherein a first one of said at least two predetermined spectral characteristics fails substantially on a black body curve.

29. A mirror assembly as in claim 28 wherein said first one of said two predetermined spectral characteristics has a correlated color temperature between approximately 2000 Kelvins and approximately 20,000 Kelvins.

30. A mirror assembly as in claim 24 wherein a second one of said at least two predetermined spectral characteristics fails substantially on a black body curve.

31. A mirror assembly as in claim 30 wherein said second one of said at least two predetermined spectral characteristics has a correlated color temperature between approximately 2000 Kelvins and approximately 20,000 Kelvins.

32. A mirror assembly as in claim 22 wherein said substantially the same spectral characteristics are operator selectable from at least three predetermined spectral characteristics.

33. A mirror assembly as in claim 32 wherein a first one of said at feast three predetermined spectral characteristics is between approximately 615 nm and approximately 670 nm.

34. A mirror assembly as in claim 32 wherein a first one of said at least three predetermined spectral characteristics is between approximately 500 nm and approximately 520 nm.

35. A mirror assembly as in claim 32 wherein a first one of said at least three predetermined spectral characteristics is between approximately 460 nm and approximately 480 nm.

36. A mirror assembly as in claim 33 wherein a second one of said at least three predetermined spectral characteristics is between approximately 500 nm and approximately 520 nm.

37. A mirror assembly as in claim 33 wherein a second one of said at least three predetermined spectral characteristics is between approximately 460 nm and approximately 480 nm.

38. A mirror assembly as in claim 36 wherein a third one of said at least three predetermined spectral characteristics is between approximately 460 nm and approximately 480 nm.

39. A mirror assembly as in claim 32 wherein a first one of said at least three predetermined spectral characteristics falls substantially on a black body curve.

40. A mirror assembly as in claim 39 wherein said first one of said three predetermined spectral characteristics has a correlated color temperature between approximately 2000 Kelvins and approximately 20,000 Kelvins.

41. A mirror assembly as in claim 33 wherein a second one of said at least three predetermined spectral characteristics falls substantially on a black body curve.

42. A mirror assembly as in claim 41 wherein said second one of said at least three predetermined spectral characteristics has a correlated color temperature between approximately 2000 Kelvins and approximately 20,000 Kelvins.

43. A mirror assembly as in claim 34 wherein a second one of said at least three predetermined spectral characteristics falls substantially on a black body curve.

44. A mirror assembly as in claim 43 wherein said second one of said at least three predetermined spectral characteristics has a correlated color temperature between approximately 2000 Kelvins and approximately 20,000 Kelvins.

45. A mirror assembly as in claim 35 wherein a second one of said at least three predetermined spectral characteristics fails substantially on a black body curve.

46. A mirror assembly as in claim 45 wherein said second one of said at least three predetermined spectral characteristics has a correlated color temperature between approximately 2000 Kelvins and approximately 20,000 Kelvins.

47. A mirror assembly as in claim 22 wherein said at least one illuminated operator interface is selected from the group comprising a pushbutton, a momentary pushbutton, a slide bar switch, a toggle switch, a "thumb-wheel" switch (such as a variable potentiometer), a rotary switch, a "rocker" switch and a "latching" pushbutton.

48. A mirror assembly as in claim 22 further comprising at least one device selected from the group comprising a voice activated system, a trainable transceiver, a microphone, a compass sensor, a compass system, a telephone system, a highway toll booth interface, a telemetry system, an exterior light controller, a moisture sensor, a loran system, a global positioning system, a variable reflectance reflector, a vehicle vision system, an accessory module, a remote keyless entry system, a wireless communication interface, a CAN bus interface, a serial bus interface, a parallel bus interface, a light sensor, a camera, a climate control system, a power supply, a controller, a transflective reflector, a tire pressure monitoring system, a navigation system, a lane departure warning system, and an adaptive cruise control system.

49. A mirror assembly, comprising:
at least one interior illuminator;
at least one illuminated operator interface, wherein light rays emitted from said at least one interior illuminator and light rays emitted from said at least one illuminated operator interface comprise substantially the same spectral characteristics; and
at least one device selected from the group comprising a voice activated system, a trainable transceiver, a microphone, a compass sensor, a compass system, a telephone system, a highway toll booth interface, a telemetry system, an exterior light controller, a moisture sensor, a loran system, a global positioning system, a variable reflectance reflector, a vehicle vision system, an accessory module, a remote keyless entry system, a wireless communication interface, a CAN bus interface, a serial bus interface, a parallel bus interface, a light sensor, a camera, a climate control system, a power supply, a controller, a transflective reflector, a tire pressure monitoring system, a navigation system, a lane departure warning system, and an adaptive cruise control system.

50. A mirror assembly as in claim 49 further comprising at least one information display.

51. A mirror assembly as in claim 50 wherein said at least one information display is selected from the group comprising a vacuum florescent display, a segmented light emitting diode display, a matrix light emitting diode display, an organic light emitting diode display, a back lit liquid crystal display, a negative mode liquid crystal display, a positive mode liquid crystal display, a liquid crystal display, a backlit indicia display, a plasma display, and a gas discharge display.

52. A vehicle system comprising:
a mirror assembly, said mirror assembly comprising at least one interior illuminator and at least one illuminated operator interface, wherein light rays emitted from said at least one interior illuminator and light rays emitted from said at least one illuminated operator interface comprise substantially the same spectral characteristics.

53. A vehicle system as in claim 52 further comprising at least one information display.

54. A vehicle system as in claim 53 wherein said information display emits light rays comprising substantially the same spectral characteristics as said illuminated operator interface and said interior illumination assembly.

55. A vehicle system as in claim 52 further comprising at least one additional device selected from the group comprising an illuminated operator interface, an illumination assembly and an information display.

56. A vehicle system as in claim 55 wherein said at least one additional device comprising spectral characteristics substantially the same as said at least one illuminated operator interface and said at least one interior illumination assembly in said mirror assembly.

57. A vehicle system as in claim 55 wherein said at least one additional device is positioned in a location selected from the group comprising a vehicle console, an exterior rearview mirror, a headliner, a visor, a door panel, an A-pillar, a B-pillar, a C-pillar, a center console, a dash board, an instrument panel, a steering wheel, a radio, a glove compartment, a seat, a heater control, an air conditioning control, a defroster control, a vent control, a defogger Control and upon the exterior of a vehicle.

58. A vehicle system as in claim 52 further comprising at least one device selected from the group comprising a voice activated system, a trainable transceiver, a microphone, a compass sensor, a compass system, a telephone system, a highway toll booth interface, a telemetry system, an exterior light controller, a moisture sensor, a loran system, a global positioning system, a variable reflectance reflector, a vehicle vision system, an accessory module, a remote keyless entry system, a wireless communication interface, a CAN bus interface, a serial bus interface, a parallel bus interface, a light sensor, a camera, a climate control system, a power supply, a controller, a transflective reflector, a tire pressure monitoring system, a navigation system, a lane departure warning system, and an adaptive cruise control system.

* * * * *

UNITED STATES PATENT AND TRADEMARK OFFICE
CERTIFICATE OF CORRECTION

PATENT NO. : 6,958,495 B2
APPLICATION NO. : 10/393445
DATED : October 25, 2005
INVENTOR(S) : Kazuhiko Nishijima et al.

It is certified that error appears in the above-identified patent and that said Letters Patent is hereby corrected as shown below:

Col. 3, line 60
 replace "approximate"
 with --approximately--.

Col. 7, line 1
 replace "preferable"
 with --preferably--.

Col. 7, line 3
 replace "approximate"
 with --approximately--.

Col. 8, lines 65-66
 replace "any where"
 with --anywhere--.

Col. 10, line 26
 replace "any where"
 with --anywhere--.

Col. 11, line 52
 replace "U.S. patent application Ser. No."
 with --U.S. Pat. No.--.

Col. 12, line 18
 replace "PCTNWO97/EP498"
 with --PCT/WO97/EP498--.

Col. 13, line 8
 replace "Summitt"
 with --Summit--.

Col. 14, line 36
 relace "09/989,559, 10/210,910"
 with --09/989,559,--.

Col. 16, line 11
 replace "No."
 with --Publication No.--.

UNITED STATES PATENT AND TRADEMARK OFFICE
CERTIFICATE OF CORRECTION

PATENT NO. : 6,958,495 B2
APPLICATION NO. : 10/393445
DATED : October 25, 2005
INVENTOR(S) : Kazuhiko NIshijima et al.

It is certified that error appears in the above-identified patent and that said Letters Patent is hereby corrected as shown below:

Col. 16, line 12
replace "of a"
with --of--.

Col. 16, line 50
replace "best of"
with --best--.

Col. 16, line 59
replace "Interface"
with --interface--.

Col. 17, line 24
replace "et"
with --at--.

Col. 18, line 39
replace "fails"
with --falls--.

Col. 18, line 46
replace "fails"
with --falls--.

Col. 18, line 56
replace "feast"
with --least--.

Col. 19, line 30
replace "fails"
with --falls--.

UNITED STATES PATENT AND TRADEMARK OFFICE
CERTIFICATE OF CORRECTION

PATENT NO. : 6,958,495 B2
APPLICATION NO. : 10/393445
DATED : October 25, 2005
INVENTOR(S) : Kazuhiko NIshijima et al.

It is certified that error appears in the above-identified patent and that said Letters Patent is hereby corrected as shown below:

Col. 20, line 50
 replace "Control"
 with --control--.

Signed and Sealed this

First Day of August, 2006

JON W. DUDAS
*Director of the United States Patent and Trademark Office*